| United States Patent [19] | [11] Patent Number: 4,667,740 |
|---|---|
| Maddox, Jr. | [45] Date of Patent: May 26, 1987 |

[54] SURFACTANT FLOODING SYSTEM

[75] Inventor: Jim Maddox, Jr., Houston, Tex.

[73] Assignee: Texaco, Inc., White Plains, N.Y.

[21] Appl. No.: 751,109

[22] Filed: Jul. 2, 1985

[51] Int. Cl.$^4$ ............................................. E21B 43/22
[52] U.S. Cl. .................................... 166/274; 166/273; 252/8.554
[58] Field of Search ................... 252/8.55 D; 166/274, 166/273

[56] References Cited

U.S. PATENT DOCUMENTS

| 3,348,611 | 10/1967 | Reisberg | 166/274 X |
|---|---|---|---|
| 3,467,187 | 9/1969 | Gogarty et al. | 166/273 |
| 3,500,924 | 3/1970 | Poettmann | 166/273 X |
| 3,507,331 | 4/1970 | Jones | 166/273 |
| 3,508,612 | 4/1970 | Reisberg et al. | 252/8.55 X |
| 3,638,728 | 2/1972 | Hill | 166/273 |
| 3,858,656 | 1/1975 | Flournoy et al. | 166/274 |
| 4,110,229 | 8/1978 | Carlin et al. | 252/8.55 |
| 4,232,737 | 11/1980 | Tyler et al. | 166/273 |
| 4,433,730 | 2/1984 | Trushenski | 166/273 X |

*Primary Examiner*—Herbert B. Guynn
*Attorney, Agent, or Firm*—Jack H. Park; Kenneth R. Priem; Harold J. Delhommer

[57] ABSTRACT

A method for modifying a sulfonate surfactant flooding system so as to permit the use of fluids of increased salinity in the polymer drive. Sulfonate systems are altered by adding about 0.05% to about 1.0% by weight of a divalent metal cation to give a total concentration of about 0.1% to about 1.0% by weight of divalent metal cation to one or more surfactant slugs of the surfactant flooding system, and adding about 0.1% to about 1.5% by weight of a sulfate or sulfonate solubilizer to the polymer drive fluid. The concentration of oil soluble petroleum sulfonates may also be decreased while the concentration of water soluble petroleum sulfonates may be increased without a decrease in surfactant slug performance.

6 Claims, 4 Drawing Figures

SURFACTANT FLOODING SYSTEM

BACKGROUND OF THE INVENTION

This invention relates to the recovery of oil from subterranean formations by water flood operations and more particularly relates to the use of divalent metal ions and chemical additives in surfactant flooding operations.

Petroleum fluids are usually recovered from a subterranean formation or reservoir by employing the natural energy of the reservoir to push the petroleum fluids from the reservoir into wellbores. The technique is referred to as primary recovery. However, 65% to 90% or more of the original oil is usually left in the reservoir at the conclusion of the primary recovery program. When the natural reservoir energy is unable to produce petroleum fluids at an economically determined rate, it is conventional to employ enhanced oil recovery techniques in order to recover more of the petroleum fluids remaining in the reservoir.

One such enhanced oil recovery technique employed is a water flood operation. A water flood operation uses injection wells drilled into the reservoir to inject flood water into the reservoir. The flood water increases the pressure in the reservoir and initially provides additional energy to push oil into production wellbores for recovery. The flood water replaces the oil that is initially produced and forms a wave front traveling through the reservoir towards the production wellbores. The water wave front displaces at least some of the oil in the reservoir and drives or carries this oil through the formation into production wellbores for recovery. Water flood operations can achieve advantageous recovery of oil when subsurface geological conditions are favorable.

However, even when geological conditions favor a water flood operation, oil recovery may be limited due to the relatively poor ability of the flood water to displace oil remaining in the reservoir's pore structure. This is due to several factors including the pore size of the reservoir, its structure, and oil viscosity. The pore size and structure of the reservoir along with the oil resisting dispersion in the water may make the pore structure impermeable to the oil, while the pore structure is permeable to the flood water. So the flood water, having less flow resistance than the oil, may form channels or fingers, bypassing the oil in the formation. For this reason, a large portion of the oil usually remains in the reservoir after a water flood operation.

Investigations of ways to increase oil recovery by improving the displacement ability of a water flood have produced useful surfactants which reduce the interfacial tension between the oil and water in the reservoir. With lower interfacial tension, oil that was trapped in the pore structure can disperse into the water as smaller and more easily deformable droplets. Many types of surfactants have been investigated and the choice of which surfactant to employ in a water flood operation is dependent upon the conditions in the reservoir, as well as the cost and availability of the surfactants.

U.S. Pat. No. 3,366,174 to Ferrell et al. discloses a water flood surfactant composition of a low to medium weight petroleum sulfonate and an oil-soluble organic polar material. U.S. Pat. No. 3,508,612 to Reisberg et al. discloses a water flood surfactant composition of an organic sulfonate and a sulfated oxyalkylated alcohol. Various other mixtures of anionic and nonionic surfactants are sometimes employed in water flood operations. U.S. Pat. Nos. 3,811,504; 3,811,505; 3,890,239, are representative of such mixtures of anionic and nonionic surfactants used in water flood operations.

Most water flood operations have employed a petroleum sulfonate as a sole surfactant, or at least a major component of a mixture of surfactants. Synthetic alkylaryl sulfonates and alkyl sulfonates and sulfates have been proposed as oil recovery surfactants.

Field water flood operations employing an organic sulfonate surfactant have not always been totally satisfactory due to the fact that surfactants sometimes separate from the water and form a non-miscible layer on top of the water. This layer does not move in conjunction with the water wave front, resulting in loss of oil recovery activity and a quantity of surfactant. Further, when organic sulfonates contact divalent metal ions, which are almost always present in underground hydrocarbon formations, the organic sulfonates tend to precipitate out of the water flood and plug the reservoir pores. As a result, the prior art suggests avoiding divalent metal ions in the surfactant system, and especially in the drive fluid.

To combat layering and precipitation problems, a material with both water-soluble and oil-soluble characteristics is usually added to organic sulfonate surfactant mixtures. When used in water flooding, these materials are generally referred to as "solubilizers" and often constitute the most expensive component in a surfactant mixture. Conventional solubilizers are sulfate or sulfonate salts of polyethoxylated alcohols or alkyl phenols. The amount of solubilizer required depends on the amount of and types of organic sulfonate surfactants employed in the water flood operation. A minimum amount of solubilizer is required to prevent the surfactants from layering out of the flood water. Surfactant quantity is in turn a function of the reservoir's size and other characteristics.

SUMMARY OF THE INVENTION

The invention is a method for modifying a sulfonate surfactant flooding system so as to permit the use of fluids of increased salinity in the polymer drive. Sulfonate systems are altered by adding about 0.05% to about 1.0% by weight of a divalent metal cation to give a total concentration of about 0.1% to about 1.0% by weight of divalent metal cation to one or more surfactant slugs of the surfactant flooding system, and adding about 0.1% to about 1.5% by weight of a sulfate or sulfonate solubilizer to the polymer drive fluid.

Such a modification of the surfactant and polymer slugs allows the use of high salinity brines in the polymer drive fluid without a substantial decrease in recovery efficiency. In fact, with such additions, the recovery efficiency of a surfactant flood may even increase despite the use of high salinity brines in the polymer drive solution. This method offers substantial cost savings from the ability to use field brine in many cases and permits the use of a surfactant flood in fields where fresh water simply is not available.

A further advantage of the method is that the use of the added divalent metal cations in the surfactant slug permits the reduction in concentration of oil-soluble sulfonates and the increase in concentration of water-soluble sulfonates without a decrease in surfactant slug performance. This offers further savings in cost since oil-soluble sulfonates are more costly than water-soluble sulfonates.

DETAILED DESCRIPTION

Figure 1:
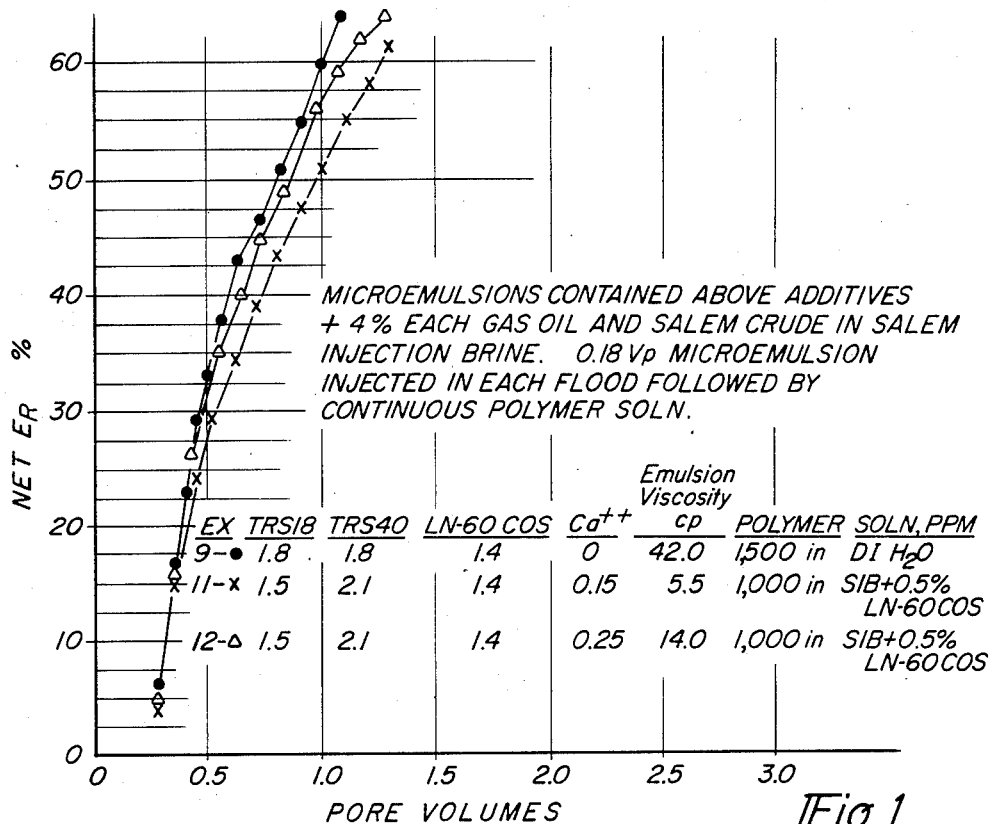
FIG. 1 is a plot of three core floods employing the invention method wherein net recovery efficiency is plotted against pore volumes of throughput.

It is well known that conventional surfactant mixtures are usually composed of one or more petroleum sulfonates, a solubilizer, brine and, optionally, a quantity of hydrocarbon. These components are combined to make a surfactant system for use in flooding operations.

The surfactant system is conventionally injected to the reservoir in one or more slugs to form a front followed by the injection of water which normally contains a polymer to increase the viscosity of the water drive. Most surfactant flooding systems require fresh water in the fluid drive to yield high net recovery efficiencies for the surfactant flood.

A typical prior art surfactant system may be:
1. One or more sulfonates, such as
   (a) a water-soluble sulfonate having a relatively low equivalent weight (about 320), and
   (b) an oil-soluble sulfonate having a relatively high equivalent weight (about 500), or
   (c) any other commercially available petroleum sulfonates;
2. A solubilizer such as alkylpolyalkoxyalkyl sulfate or sulfonate; or alkylarylpolyalkoxyalkyl sulfate or sulfonate;
3. Brine; and
4. Optionally, crude oil or crude oil and a refined product.

The polymer drive fluid following the surfactant slug or slugs is usually fresh water or a low salinity brine. The use of high salinity brines for a polymer drive fluid generally decreases recovery efficiency of the flood to an uneconomic level. The present invention method permits the use of these higher salinity field brines in a polymer drive fluid without substantially decreasing recovery efficiency.

The invention specifically comprises adding about 0.05% to about 1% of a divalent metal cation, preferably calcium or magnesium, to the surfactant slug or slugs to yield a total concentration of divalent metal cation of about 0.1% to about 1.0% by weight. Since the surfactant slug will normally be made from a field brine and contain some salinity, it is necessary to investigate the effect of added divalent metal cations to the specific slug formulation proposed in order to achieve the best results. The addition of calcium cations can also be accomplished by substituting calcium salts of petroleum sulfonates for some of the sodium or ammonium petroleum sulfonates normally employed in a surfactant slug. Preferably, the divalent metal cation will be added to the surfactant slug in the amount of about 0.1% to about 0.7% by weight.

Second, about 0.1% to about 1.5% of a sulfate or sulfonate solubilizer is also added to the polymer drive fluid. The solubilizer compound should be a solubilizer such as alkylpolyalkoxyalkyl sulfates or sulfonates; or alkylarylpolyalkoxyalkyl sulfates or sulfonates. Some preferred solubilizer compounds are sulfated and sulfonated derivatives of alkoxylated alcohols and alkoxylated alkylphenols. Preferably, the solubilizer will be added to the polymer drive in the amount of about 0.2% to about 1% by weight. But these amounts may vary substantially from one surfactant system to another.

The addition of the divalent metal cation, most preferably calcium, to the surfactant slug optionally permits the lowering of the concentration of oil-soluble petroleum sulfonate (usually sodium or ammonium monovalent salts) in the surfactant slugs and a concurrent increase in the concentration of water-soluble petroleum sulfonate surfactant (usually sodium or ammonium monovalent salts) in the sulfonate system. Such a decrease in the concentration of oil-soluble petroleum sulfonate is advantageous for several reasons. First, oil-soluble petroleum sulfonates cost substantially more than water-soluble petroleum sulfonates. Thus, assuming surfactant flooding efficiency can be maintained at approximately the same level, the flood will be cheaper. Second, the replacing of oil-soluble petroleum sulfonate with water-soluble petroleum sulfonate will lower the viscosity of the surfactant slug. This will substantially improve the mobility ratio between the surfactant slug and the following drive fluid, reducing fingering and permitting a more piston-like displacement of the surfactant slug by the drive fluid. Furthermore, viscosity that is too high for the surfactant slug will reduce the displacement rate of the surfactant system, prolonging the length of time required for the enhanced recovery operation.

The following examples will further illustrate the enhanced oil recovery method of the present invention. These examples are given by way of illustration and not as limitations on the scope of the invention. Thus, it should be understood that the compounds and the amounts of compounds mentioned herein may be varied while still remaining within the scope of the invention.

EXAMPLES 1–8

Preliminary studies were conducted to indicate the viscosity effects of adding calcium ions and changing the ratio of oil-soluble petroleum sulfonate to water-soluble petroleum sulfonate in a surfactant system. Surfactant microemulsion systems were prepared with a Southern Illinois field brine having 74,000 grams per cubic meter total dissolved solids (TDS) and 2500 grams per cubic meter of divalent ion (the brine is hereinafter referred to as SIB), 4% gas/oil and 4% of a crude oil having a gravity of about 38° API and the components listed in Table 1.

TRS-18 is a trademarked oil-soluble sulfonate surfactant sold by Witco Chemical Co. having an equivalent weight of about 500. TRS-40 is a trademarked water-soluble petroleum sulfonate surfactant sold by Witco Chemical Co. having an equivalent weight of about 350. LN-60 COS is a trademarked sulfated $C_{12}$–$C_{14}$ alcohol with an average of about 6 ethylene oxide groups sold by Texaco Chemical Co.

TABLE I

| Example No. | TRS 18, % w/v | TRS 40, % w/v | LN-60 COS, % w/v | Ca++ Added ppm. | Viscosity, cp, 74° F., at 7.3 sec.$^{-1}$ |
|---|---|---|---|---|---|
| 1 | 1.8 | 1.8 | 1.4 | 0 | 42.0 |
| 2 | 1.5 | 2.1 | 1.4 | 1,500 | 6.0 |
| 3 | 1.5 | 2.1 | 1.4 | 2,000 | 11.5 |
| 4 | 1.5 | 2.1 | 1.4 | 2,500 | 18.5 |
| 5 | 1.4 | 2.2 | 1.4 | 2,000 | 3.0 |
| 6 | 1.4 | 2.2 | 1.4 | 3,000 | 4.0 |
| 7 | 1.4 | 2.2 | 1.4 | 4,000 | 7.5 |
| 8 | 1.4 | 2.2 | 1.4 | 5,000 | 19.5 |

The above data of Table 1 indicates that surfactant microemulsion viscosity increased whenever the concentration of oil-soluble sulfonate or calcium was increased. The table also indicates the ability to achieve a wide range of microemulsion viscosity by varying the ratio of oil-soluble sulfonate to water-soluble sulfonate and the amount of calcium ions added. Qualitative observations made in the laboratory indicated that the same pattern was followed when additional crude oil was solubilized by the microemulsions.

EXAMPLES 9–12

Core floods were run at 74° F. in a fired Berea core having a length of 1 foot with 0.18 pore volumes of the surfactant systems of Examples 1 and 2 above. The cores were cleaned and saturated with brine. The brine was then displaced with a Southern Illinois crude oil having an API gravity of about 38°. A 0.18 pore volume surfactant slug was injected followed by a continuous polymer drive.

Examples 9 and 10 employed the Example 1 system as a surfactant slug followed by 1500 ppm of Flocon 4800 polymer, a trademarked polysaccharide sold by Pfizer, Inc. In addition to the ingredients of Examples 1, 2 and 4, the surfactant slugs of the core floods contained 4% gas oil and 4% of a Southern Illinois crude with a 38° API gravity.

TABLE 2

| | Surfactant Slug | Polymer | $E_R$ |
|---|---|---|---|
| Ex. 9 | Ex. 1 | 1500 ppm Flocon in deionized H$_2$O | 64% |
| Ex. 10 | Ex. 1 | 1500 ppm Flocon in 25% SIB | 19% |
| Ex. 11 | Ex. 2 | 1000 ppm Flocon and 0.5% LN-60 COS in 90% SIB | 61% |
| Ex. 12 | Ex. 4 | 1000 ppm Flocon and 0.5% LN-60 COS in 90% SIB | 64% |

Example 9 yielded a recovery efficiency of 64% when the surfactant slug was followed by the Flocon in deionized water. On the other hand, Example 10, which used the same system except for placing the Flocon polymer in a fluid comprising 25% SIB and 75% deionized water, yielded a recovery efficiency of only 19%. Example 10 is a demonstration of the drastic effect that brine in a polymer fluid drive may have on recovery efficiency. Examples 11 and 12 used a very similar system to that of Example 9, except for the added calcium ions in the surfactant slug and LN-60 COS solubilizer in the polymer drive according to the present invention. Recovery efficiency was almost identical to that of Example 9 but was achieved with the use of a high salinity brine in the polymer water drives and less oil-soluble petroleum sulfonate surfactant. In addition, this similar recovery efficiency for Examples 11 and 12 was achieved with surfactant slugs having a viscosity of only 6 centipoise and 18 cp, respectively, as opposed to 42 centipoise for the surfactant system of Example 1. Such systems may prove advantageous in tight formations where surfactant system viscosity is important. Polymer viscosities were 57 centipoise for Example 9, 33.5 centipoise for Example 11 and 31.5 centipoise for Example 12.

FIG. 1 plots the results of the core floods of Examples 9, 11 and 12 as net recovery efficiency versus pore volumes of throughput. All floods were conducted by injecting 0.18 pore volumes of the surfactant system followed by continuous injection of polymer solution. FIG. 1 indicates that Example 12 achieves the same recovery efficiency as Example 9, although Example 12 required a greater polymer fluid injection to achieve the same recovery efficiency. And this was achieved in Example 12 with the almost exclusive use of a high salinity brine in the polymer solution.

EXAMPLES 13≅16

Figure 2:
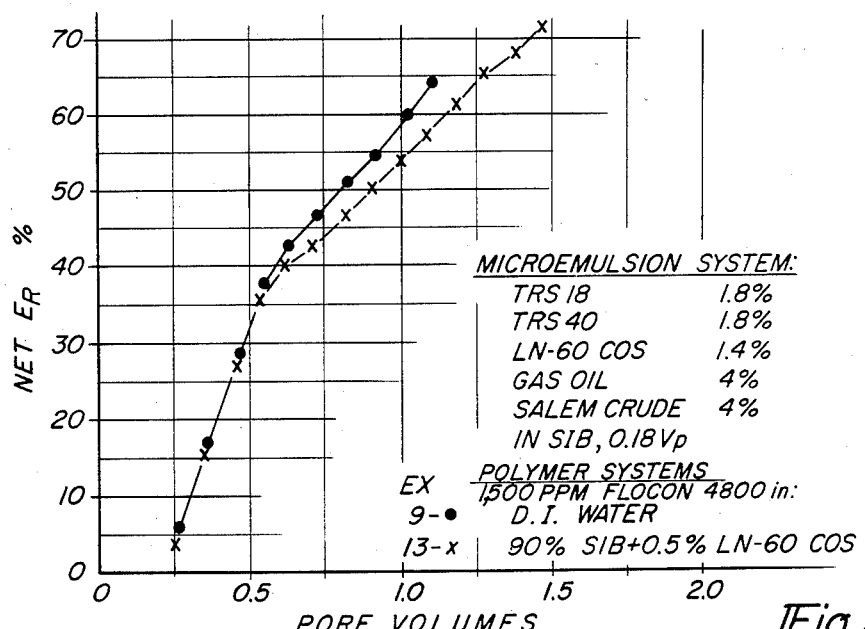
FIG. 2 is a plot of net recovery efficiency versus pore volume for a surfactant flooding system showing two variations in polymer drive fluids.

Some additional core floods were done with and without calcium ions added to the surfactant slug and with different polymer drive solutions. FIG. 2 compares the results of core floods of Examples 9 and 13, wherein both core floods were performed with the surfactant system of Example 1. Example 13 is of some interest since recovery efficiency improved with the use of the LN-60 COS solubilizer along with the brine in the polymer solution. This improvement, however, was achieved at the cost of an extra 0.4 pore volumes of polymer drive fluid.

Figure 3:
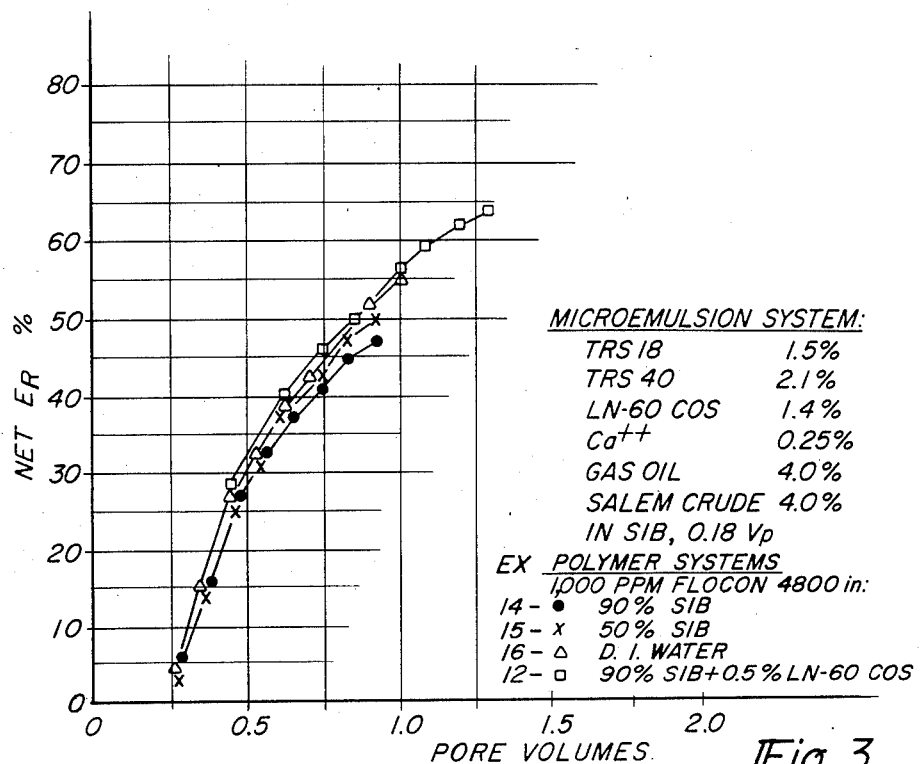
FIG. 3 is a plot of net recovery efficiency versus pore volume for a surfactant flooding system containing calcium cations with several different polymer fluid drives.

Examples 14–16 were run as indicated in FIG. 3, all using the surfactant system of Example 2 containing 0.15% calcium ions added to the SIB field brine containing 0.25% calcium ions followed by different polymer drives. FIG. 3 plots the net recovery efficiency versus pore volumes for Examples 12 and 14–16. Comparable results were achieved for the core flood of Example 12 as for the core flood of Example 9 despite using substantially less of the more costly oil-soluble petroleum sulfonate surfactant in the surfactant system and using a high salinity brine in the polymer drive solution.

EXAMPLES 17–18

Figure 4:
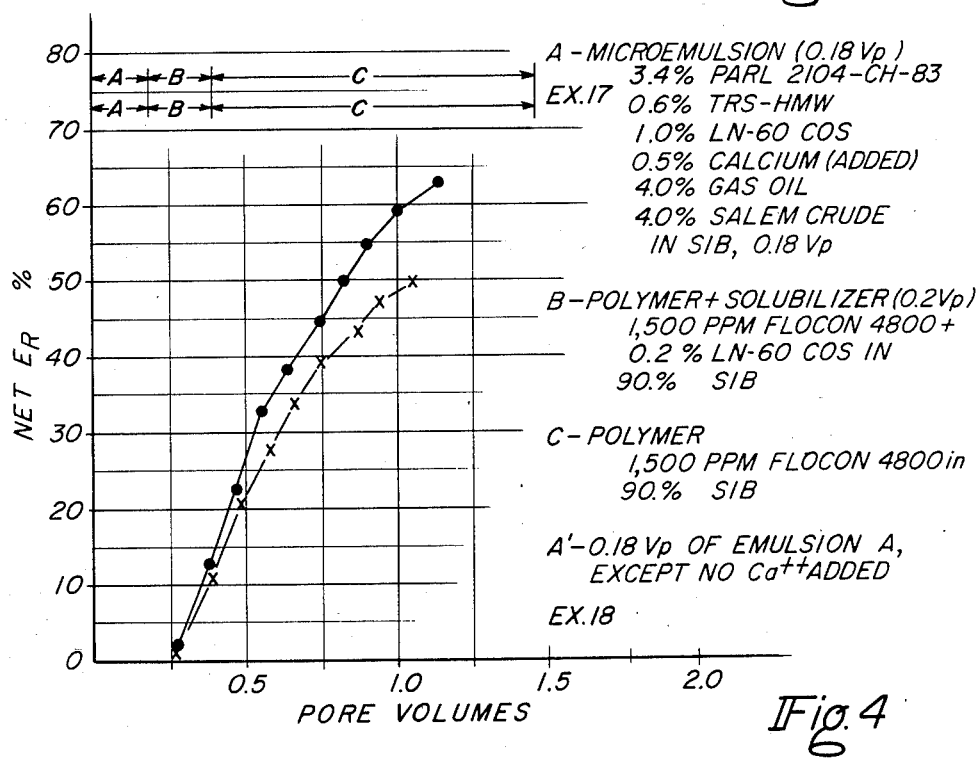
FIG. 4 is a plot of net recovery efficiency versus pore volumes of throughput for a surfactant flooding system containing calcium ions followed by various polymer fluid drives with brine.

The core flood results of Examples 17 and 18 are illustrated in FIG. 4. The surfactant slug for Example 11 was 3.4% of a sodium petroleum sulfonate salt having an equivalent weight of about 374; 0.6% of TRS-HMW a trademarked oil soluble petroleum sulfonate with an equivalent weight of about 530 sold by Witco Chemical Co.; 1.0% of LN-60 COS; 0.5% (5000 ppm) of added calcium ions; 4.0% gas oil; and 4.0% of a Southern Illinois crude having a 38° API gravity; all in the above-mentioned SIB brine. The Example 18 surfactant slug was identical to the Example 17 surfactant slug except it did not contain added calcium ions. It only contained the 2500 ppm divalent ions present in the SIB.

In both examples, the surfactant slug was followed with 0.2 pore volumes of 1500 ppm Flocon 4800 plus 0.2% LN-60 COS in 90% SIB. This polymer slug was followed by a continuous drive of 1500 ppm Flocon 4800 in 90% SIB. Substantially better results were achieved in the core flood containing added calcium ions. A net recovery efficiency of 63% was obtained for Example 17 with the added calcium ions versus a net recovery efficiency of 50% for Example 18.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method for modifying a sulfonate surfactant flooding system and recovering hydrocarbons from an underground formation, said system comprised of one or more sulfonate surfactant slugs and a following polymer drive fluid to be injected into an underground hydrocarbon formation to permit the use of increased salinity in the polymer drive fluid without a substantial decrease in recovery efficiency, comprising:

adding about 0.05% to about 1.0% by weight of a divalent metal cation to said one or more surfactant slugs of the surfactant flooding system to give a total concentration of about 0.1% to about 1.0% by weight of divalent metal cations and injecting said one or more surfactant slugs into the formation; and adding about 0.1% to about 1.5% by weight of a solubilizer compound to said polymer drive fluid and injecting said polymer drive fluid into the formation and recovering hydrocarbons from said formation, said solubilizer compound selected from the group consisting of alkylpolyalkoxyalkyl sulfates, alkylpolyalkoxyalkyl sufonates, alkylarylpolyalkoxyalkyl sulfates, and alkylarylpolyalkoxyalkyl sulfonates.

2. The method of claim 1, wherein the divalent metal cation is calcium or magnesium.

3. The method of claim 1, wherein the divalent metal cation is added in the amount of about 0.1% to about 0.7% by weight.

4. The method of claim 1, wherein the solubilizer compound is added in the amount of about 0.2% to about 1% by weight.

5. The method of claim 1, wherein one or more surfactant slugs of the surfactant flooding system is comprised of an oil-soluble pertroleum sulfonate and a water-soluble petroleum sulfonate.

6. A method for modifying a sulfonate surfactant flooding system and recovering hydrocarbons from an underground formation, said system comprised of one or more sulfonate surfactant slugs and a following polymer drive fluid to be injected into an underground hydrocarbon formation to permit the use of increased salinity in the polymer drive fluid without a substantial decrease in recovery efficiency, comprising:

adding about 0.1% to about 0.7% by weight of calcium ion to said one or more surfactant slugs of the surfactant flooding system to give a total concentration of about 0.1% to about 1.0% by weight of divalent metal cations and injecting said one or more surfactant slugs into the formation; and adding about 0.2% to about 1.0% by weight of a solubilizer compound to said polymer drive fluid and injecting said polymer drive fluid into the formation and recovering hydrocarbons from said formation;

said solubilizer compound selected from the group consisting of alkylpolyalkoxyalkyl sulfates, alkylpolyalkoxyalkyl sulfonates, alkylarylpolyalkoxyalkyl sulfates, and alkylarylpolyalkoxyalkyl sulfonates.

* * * * *